(12) United States Patent
Reinsberg et al.

(10) Patent No.: US 11,106,767 B2
(45) Date of Patent: Aug. 31, 2021

(54) DECENTRALIZED NAME VERIFICATION USING RECURSIVE ATTESTATION

(71) Applicant: Celo Foundation, San Francisco, CA (US)

(72) Inventors: Rene Reinsberg, San Francisco, CA (US); Sepandar Kamvar, Belmar, NJ (US); Marek Olszewski, San Francisco, CA (US)

(73) Assignee: CELO FOUNDATION, San Francisco, CA (US)

( * ) Notice: Subject to any disclaimer, the term of this patent is extended or adjusted under 35 U.S.C. 154(b) by 71 days.

(21) Appl. No.: 16/216,022

(22) Filed: Dec. 11, 2018

(65) Prior Publication Data

US 2019/0180011 A1    Jun. 13, 2019

Related U.S. Application Data

(60) Provisional application No. 62/597,049, filed on Dec. 11, 2017.

(51) Int. Cl.
| | |
|---|---|
| *G06F 21/31* | (2013.01) |
| *G06F 16/335* | (2019.01) |
| *H04L 29/06* | (2006.01) |
| *G06F 21/45* | (2013.01) |

(52) U.S. Cl.
CPC .......... *G06F 21/31* (2013.01); *G06F 16/335* (2019.01); *G06F 21/45* (2013.01); *H04L 63/12* (2013.01); *H04L 63/126* (2013.01)

(58) Field of Classification Search
CPC ........ G06F 21/31; G06F 21/45; G06F 16/335; H04L 63/12; H04L 63/126
See application file for complete search history.

(56) References Cited

U.S. PATENT DOCUMENTS

| 9,363,283 | B1 | 6/2016 | Herrera-Yagüe | |
|---|---|---|---|---|
| 9,643,722 | B1* | 5/2017 | Myslinski | .......... G06K 9/00711 |
| 2007/0179834 | A1 | 8/2007 | Carter | |

(Continued)

OTHER PUBLICATIONS

International Search Report and Written Opinion for Application No. PCT/US2018/064948, dated Mar. 4, 2019, 12 pages.

(Continued)

*Primary Examiner* — Hee K Song
(74) *Attorney, Agent, or Firm* — Butzel Long

(57) ABSTRACT

Systems and techniques are provided for decentralized name verification using recursive attestation. A name and identifying information may be received at a computing device. The computing device may determine that there is a contact item that includes both the name and the identifying information in a contacts database stored on the computing device or accessible to the computing device. A positive attestation and an attestation score for an entity associated with the computing device may be sent to be used to generate an attestation score for the name and identifying information. The attestation score for the name and identifying information is used to determine whether to allow the creation of an account with the name. The attestation score for the entity associated with the computing device may be generated based a positive attestation from another computing device.

18 Claims, 12 Drawing Sheets

(56) References Cited

U.S. PATENT DOCUMENTS

| | | | |
|---|---|---|---|
| 2010/0203874 A1 | 8/2010 | Scott | |
| 2014/0007179 A1 | 1/2014 | Moore | |
| 2014/0237570 A1* | 8/2014 | Shishkov | G06F 21/316 |
| | | | 726/7 |
| 2015/0066867 A1* | 3/2015 | Vronay | H04L 67/1046 |
| | | | 707/687 |
| 2015/0248736 A1* | 9/2015 | Myslinski | G06F 3/0488 |
| | | | 705/319 |
| 2016/0112369 A1* | 4/2016 | Boodaei | H04M 1/2725 |
| | | | 455/414.1 |
| 2016/0203320 A1 | 7/2016 | Valceanu | |
| 2017/0111364 A1* | 4/2017 | Rawat | H04L 63/1433 |
| 2017/0316390 A1* | 11/2017 | Smith | H04L 9/14 |
| 2017/0317833 A1 | 11/2017 | Smith | |
| 2019/0149539 A1* | 5/2019 | Scruby | H04L 9/3234 |
| | | | 713/168 |

OTHER PUBLICATIONS

International Preliminary Report on Patentability for App No. PCT/US2018/064948, dated Jun. 25, 2020, 11 pages.

* cited by examiner

FIG. 7
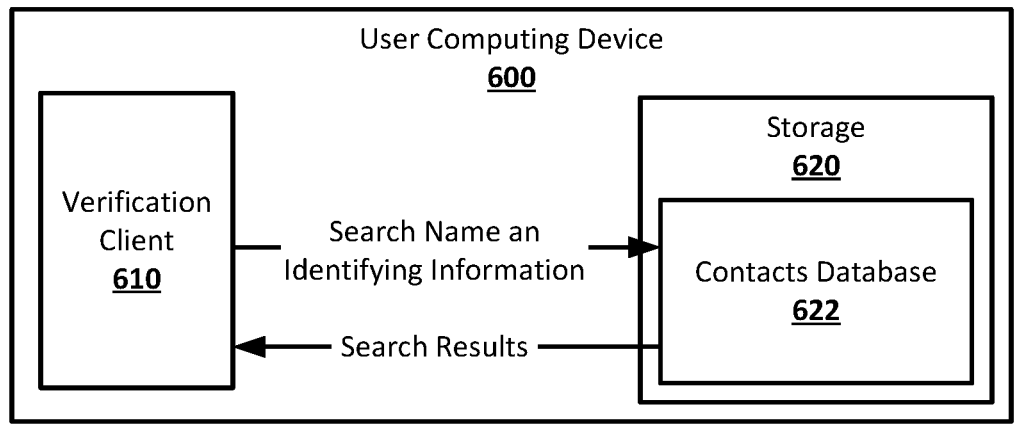
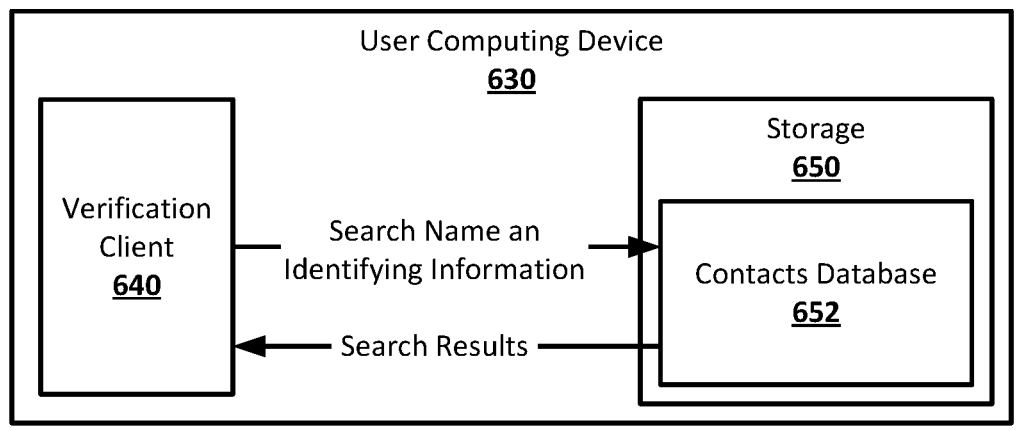
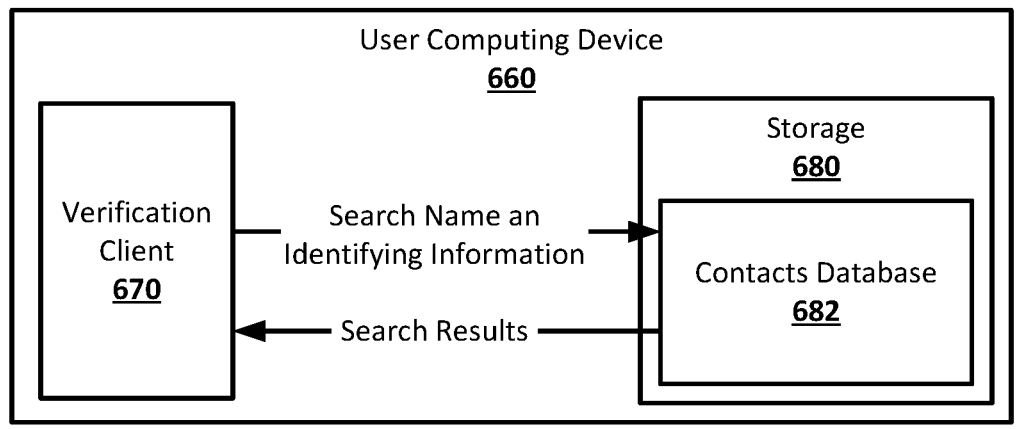

DECENTRALIZED NAME VERIFICATION USING RECURSIVE ATTESTATION

BACKGROUND

It may be useful for online services to verify that a person signing up for a user account is doing so with their actual name. Performing such a verification may be difficult and inconvenient for both the user and the online service, as it may require submission of documents confirming the user's name and review of the documents by a human reviewer.

BRIEF SUMMARY

In an implementation, a name and identifying information may be received at a computing device. The computing device may determine that there is a contact item that includes both the name and the identifying information in a contacts database stored on the computing device or accessible to the computing device. A positive attestation and an attestation score for an entity associated with the computing device may be sent to be used to generate an attestation score for the name and identifying information. The attestation score for the name and identifying information is used to determine whether to allow the creation of an account with the name. The attestation score for the entity associated with the computing device may be generated based a positive attestation from another computing device.

Systems and techniques disclosed herein may allow for decentralized name verification using recursive attestation. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 7 shows an example arrangement suitable for decentralized name verification using recursive attestation according to an implementation of the disclosed subject matter.

DETAILED DESCRIPTION

Figure 1:
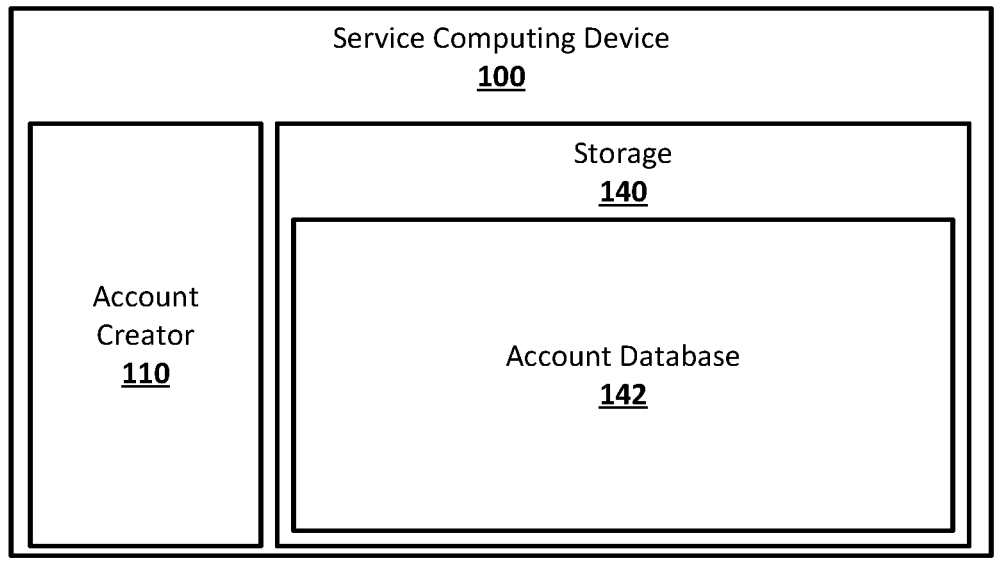
FIG. 1 shows an example system suitable for decentralized name verification using recursive attestation according to an implementation of the disclosed subject matter.

According to embodiments disclosed herein, decentralized name verification using recursive attestation may allow for the verification of a name used by a person by determining that the name is associated with other identifying information for the user in contacts databases stored on devices belonging to other people. A user may attempt to create an account with an account-based service, such as an online service, website, or application, using a name that the user claims is the user's name and other identifying information, such as a phone number or email address. The user may then provide the account-based service with some number of selected contacts from a contact database on the user's computing device. The account-based service may, using an application previously installed on the devices of the selected contacts, examine the contacts databases on the devices of the selected contacts. If the contacts databases on the device of a selected contact includes a contact that has both the name and identifying information that were provided to the account-based service by the user, this may be a positive attestation that the name belongs to the user. Positive attestations for the name and identifying information provided to the account-based service may be weighted by an attestation score of the selected contact that provided the positive attestation. The weighted positive attestations may be used to determine an attestation score for the name and identifying information. The attestation score of the selected contact may be determined similarly, based on the number of positive attestations for the selected contact. This may result in attestation scores being recursive and based on the principle eigenvector of an attestation matrix. The account-based service may use an attestation score for a name and identifying information to determine whether the name corresponds to the identifying information, which may be a proxy for whether the name and/or identifying information belong to the user attempting to create the account with the account-based service.

A user may attempt to create an account for an account-based service with a computing device. The user's computing device may be, for example, a laptop, tablet, or smartphone. The account-based service may be, for example, an online service, a website, or an application running on the user's computing device that may be used to access services and data provided by remote computing devices, such as services and data from a cloud computing server system. To create the account, the user may need to provide their name and another piece of identifying information. The name may be, for example, a full given name, including first and last name, and may or not include any middle names, prefixes, or postfixes. The identifying information may be, for example, a phone number, email address, or other communications address for any suitable type of communications service.

The account-based service may also require that the user attempting to create the account provide a selection of a number of contacts from a contacts database on the user's computing device. The contacts database may include contact items which may include contact data, such as names, email addresses, and phone numbers, that may identify a contact. A contact may be any suitable entity, such as an individual person, group, or organization. The contact items may be selected by the user in any suitable manner. For example, the account-based service may be granted access to the contacts database, and my present the contact items from the contacts database to the user as part of the account creation process. The account-based service may also interface, for example, through APIs, with an application on the user's computing device that may have access to the user's contacts database. The application may be a decentralized verification application. The decentralized verification application may allow the user to select contact items from the user's contacts database.

The contact items selected by the user may identify entities who have the decentralized verification application installed on their computing devices, and the decentralized verification applications may have access to the contacts database on these computing devices. Each instance of the decentralized verification application on a computing device of an entity identified by a selected contact item may perform a search to determine whether the name and identifying information provided by the user attempting to create the account for the account-based service is included in a contact item in the contact database on the computing devices of that entity. The instances of the decentralized verification application may be in communication, for example, using peer-to-peer networking, or may be in contact through a centralized server. The account-based service may provide the instances of the decentralized verification application with the name and identifying information provided by the user in any suitable manner. For example, the name and identifying information may be provided through peer-to-peer broadcast, or through direction transmission from the account-based service to the instances of the decentralized verification application.

Each contact item that includes both the name and identifying information provided by the user to the account-based service found in a contacts database on a computing device of an entity identified by a selected contact item may be a positive attestation. For example, the user may provide a name and phone number to the account-based service when attempting to create an account. The user may select contact items belonging to several individual persons from the user's contacts database. If a contact item with that same name and phone number is found by the decentralized verification application in a contacts database belonging to one of those individual persons, this may be a positive attestation that the name belongs to the user.

The decentralized verification application may optionally determine negative attestation when a contact item that includes both the name and identifying information provided by the user to the account-based service is not found in a contacts database on a computing device of an entity identified by a selected contact item. For example, if the name and phone number provided by the user who selected contact items for several individual persons is not found in a contact item in a contacts database on the computing device of one of those persons, this may be a negative attestation. A negative attestation may occur when no contact item is found with both the name and identifying information, either due to no contact item including either the name or identifying information, or due to a contact item that includes either of the name or identifying information not including the other of the name or identifying information. For example, a contact item that includes the identifying information, but a different name, may result in a negative attestation.

The positive attestations for the name and identifying information provided by the user may be used to determine an attestation score for the name and identifying information. To determine the attestation score, each positive attestation may be weighted by the attestation score of the entity whose contacts database was searched by an instance of the decentralized verification application resulting in the positive attestation. The attestation score of such an entity may be based on positive attestations for that entity as determined based on contacts databases on computing devices belonging to other entities, weighted by the attestation scores of those other entities. If negative attestations are used, they may similarly be weighted by an attestation score of the entity whose contacts database was searched by an instance of the decentralized verification application resulting in the negative attestation when determining an attestation score for the user. This may result in the determination of attestation scores being recursive, with attestation scores being defined by the principal eigenvector of an attestation matrix. The attestation matrix may be, for example, a matrix of normalized local trust values as used in implementations of the EigenTrust algorithm. The decentralized verification application may implement a distributed EigenTrust algorithm to determine attestation scores. Other factors may also be used in weighting a positive or negative attestation, including, for example, transactions on a permissionless blockchain between said entities, and phone call or text message logs. Attestations may also include bonds, which may be claimed by third parties that successfully challenge an attestation, for example, through a prediction market or decentralized Schelling point vote.

The account-based service may use the determined attestation score when deciding whether to allow the user to create the account with the provided name and identifying information. The attestation score may be provided to the account-based service by an instance of the decentralized verification application, which may be the instance running on the user's computing device or on the computing device of any other entity. The account-based service may set a threshold which the attestation score may need to meet or exceed in order for the user to be allowed to create the account with the provided name and identifying information.

Recursive attestation may be used for verifying other information about an entity. For example, recursive attestation may be used to verify last names, physical addresses, communications addresses, or any other information about an entity that may be found in a contact item for that entity in a contacts database on the computing device of another entity. For example, a user creating an account with an account-based service may provide the account-based service with an email address and a phone number. Recursive attestation may be used to determine an attestation score for the email address and phone number. Other attributes of an entity that may not be found in a contact item may be verified using the decentralized verification application through a user interface that may request entities identified by selected contact items verify the information. For example, a user creating an account with an account-based service may provide the account-based service with a phone number and a date of birth. The instances of the decentralized verification application running on computing devices of entities identified by the contact items selected by the user may display a user interface that may allow for the entity using the computing device to confirm the date of birth provided by the user.

In some implementations, contacts databases may be stored in an account that is part of a cloud computing service and may be accessed by the decentralized verification application from the cloud computing service instead of from a user's computing device. The decentralized database application may be given permission to access the contacts database in the cloud computing service.

In some implementations, users may be able to invite other users to use the decentralized verification application. When determining an attestation score for a user, only attestations from entities that are users who were invited by the user may be used. In some implementations, a regularization vector may be applied during the determination of an attestation score. The regularization vector may be based on the number of attestations that have been provided to each entity. In some implementations, the determination of an attestation score may have its number of recursive iterations limited to some predetermined number.

Rewards, in any suitable form, may be distributed to users who invite other users to create an account on an account-based service. The rewards, which may be, for example, monetary, or may be in the form of tokens or points, or discounts or coupons, may be distributed at regular intervals. A set quantity of rewards may be distributed and may be apportioned among users who have invited other users based on the attestation score of the users who were the inviters. For example, the reward distributed to a user may be determined as the user's attestation score multiplied by the total quantity of rewards being distributed. The attestation scores across all users to whom the rewards are distributed by sum to 1. In some implementations, only attestations from users that user has invited may be used to determine the attestations score used when determining the reward distributed to the user. This may incentivize users to invite other users.

Communication between the computing devices and systems may occur directly, for example or may be routed in any suitable manner. Communications may occur directly using any suitable communications protocols, such as, for example, HTTPS. In some implementations, instead of messages being sent by one computing device or system to another, a computing device or system may check for a message on another computing device or system. Computing devices and systems may communicate using any suitable communications hardware, including, for example, any suitable wired and wireless network adapters.

FIG. 1 shows an example system suitable for decentralized name verification using recursive attestation according to an implementation of the disclosed subject matter. A service computing device 100 may include an account creator 110 and a storage 140. The service computing device 100 may be any suitable computing device, such as, for example, a computer 20 as described in FIG. 14, or component thereof, for implementing the account creator 110 and the storage 140. The service computing device 100 may be a single computing device, or may include multiple connected computing devices, and may be, for example, a laptop, a desktop, an individual server, a server farm, or a distributed server system, or may be a virtual computing device or system. The service computing device 100 may be part of a computing system and network infrastructure, or may be otherwise connected to the computing system and network infrastructure. The service computing device 100 may be, for example, a computing device or system that provides an account-based service that may be accessed through other computing devices. For example, the service computing device 100 may provide services and/or data that may be accessed at a website through a web browser, or through a client application running on a computing device such as smartphone, tablet, or laptop. The account creator 110 may be any suitable combination of hardware and software on the service computing device 100 for allowing users to create accounts in order to use the account-based service provided by the service computing device 100. The storage 140 may be any suitable combination of hardware and software for storing data, including any suitable volatile and non-volatile storage.

The account creator 110 may be any suitable combination of hardware and software on the service computing device 100 for allowing users to create accounts in order to use the account-based service provided by the service computing device 100. The account creator 110 may be accessed by a user computing device through any suitable network connection and may allow a user to input data in order to create an account. The data input by the user may include, for example, a full name of the user and another piece of identifying information such as, for example, a phone number, email address, or other communications address. The account creator 110 may initiate verification of a name and identifying information provided by a user. The verification may use recursive attestation to determine an attestation score for the name and identifying information provided by the user. The account creator 110 may initiate the verification through interaction with a decentralized verification application which may be running on the user's computing device and may prompt a user to select contact items from their contact database. An attestation score determined for a name and identifying information provided by a user to the account creator 110 may be returned to the account creator 110. The account creator 110 may use the attestation score to determine whether to allow the creation of an account with the name and identifying information provided by the user. For example, the account creator 110 may only allow creation of the account if the attestation score meets or exceeds a threshold score.

The storage 140 may store an account database 142. The account database 142 may be, for example, a database of accounts for the account-based service provided by the service computing device 100. The storage 140, and the account database 142, may be distributed across any number of computing devices which may all be part of the account-based service. An account created by the account creator 110 may be stored in the account database 142.

Figure 2:
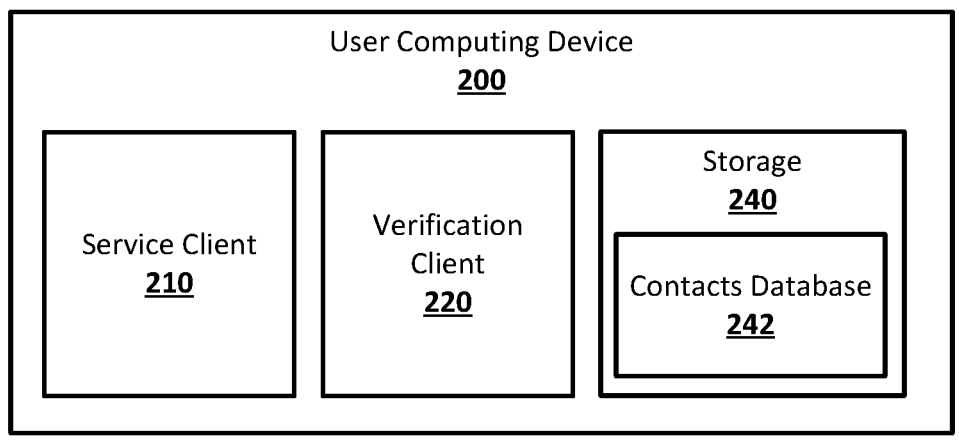
FIG. 2 shows an example system suitable for decentralized name verification using recursive attestation according to an implementation of the disclosed subject matter.

FIG. 2 shows an example system suitable for decentralized name verification using recursive attestation according to an implementation of the disclosed subject matter. A user computing device 200 may include a service client 210, a verification client 220, and a storage 240. The user computing device 200 may be any suitable computing device, such as, for example, a computer 20 as described in FIG. 14, or component thereof, for implementing the service client 210, verification client 220, and a storage 240. The user computing device 200 may be a single computing device, or may include multiple connected computing devices, and may be, for example, a laptop, a desktop, an individual server, a server farm, or a distributed server system, or may be a virtual computing device or system. The user computing device 200 may be part of a computing system and network infrastructure, or may be otherwise connected to the computing system and network infrastructure. The service client 210 may be any suitable combination of hardware and software on the user computing device 200 for accessing an account-based service. The verification client 220 may be any suitable combination of hardware and software on the user computing device 200 for implementing a decentralized verification application. The verification client 220 may be implemented using a copy of the same software application used to implement the account creator 110. The user computing device 200 may also include a storage 240 which may store a contacts database 242.

The service client 210 may be any suitable combination of hardware and software on the user computing device 200 for accessing an account-based service. The service client 210 may be, for example, a web browser used to access a website for the account-based service provided by the service computing device 100 or a client application for the account-based service provided by the service computing device 100. The service client 210 may be used to access and submit data, such as a name and identifying information, to the account creator 110.

The verification client 220 may be any suitable combination of hardware and software on the user computing device 200 for implementing a decentralized verification application. The verification client 220 may have access to the contacts database 242 in the storage 240. When the service client 210 is used to access the account creator 110 to create an account for the account-based service of the service computing device 100, the account creator 110 may interface with the verification client 210 to allow the user of the user computing device 200 to select contact items from the contact database 242 to be used for verification of a name and identifying information provided to the account creator 110. The verification client 220 may search contact items in the contact database 242 to determine whether a contact item includes both a received name and identifying information that may have been submitted to the account creator 210 from another computing device, to determine if the verification client 220 can make a positive attestation for the name and identifying information.

The verification client 220 may be able to communicate with other verification clients on other computing devices implementing other instances of the decentralized verification application. For example, the verification clients may communicate as a peer-to-peer network. The verification client 220 may determine attestation scores through recursive attestation based on communication with other verification clients on other computing devices. The verification client 220 may determine the attestation score for the name and identifying information provided to the account creator 110 using the service client 210, and may also determine attestation scores for names and identifying information provided to the account creator 110, or other account creators for other services, by service clients on other computing devices that implement their own instance of the decentralized verification application with their own verification client. In some implementations, the verification client 220 may not determine an attestation score for any name and identifying information provided by the user computing device 200. In some implementations, the verification client 220, and instance of the decentralized verification application, may be a component of the service client 210.

The storage 240 may be any suitable combination of hardware and software for storing data, including any suitable volatile and non-volatile storage, and may store the contacts database 242. The contacts database 242 may be a database of contact items. Each contact item may be for a particular entity, such as an individual person, group, or organization, and may include any suitable combination of biographical and contact information for that entity. For example, a contact item may include full name, phone number, email address, and physical address for a person. The contacts database 242 may, for example, be a stored address book on a smartphone.

Figure 3:
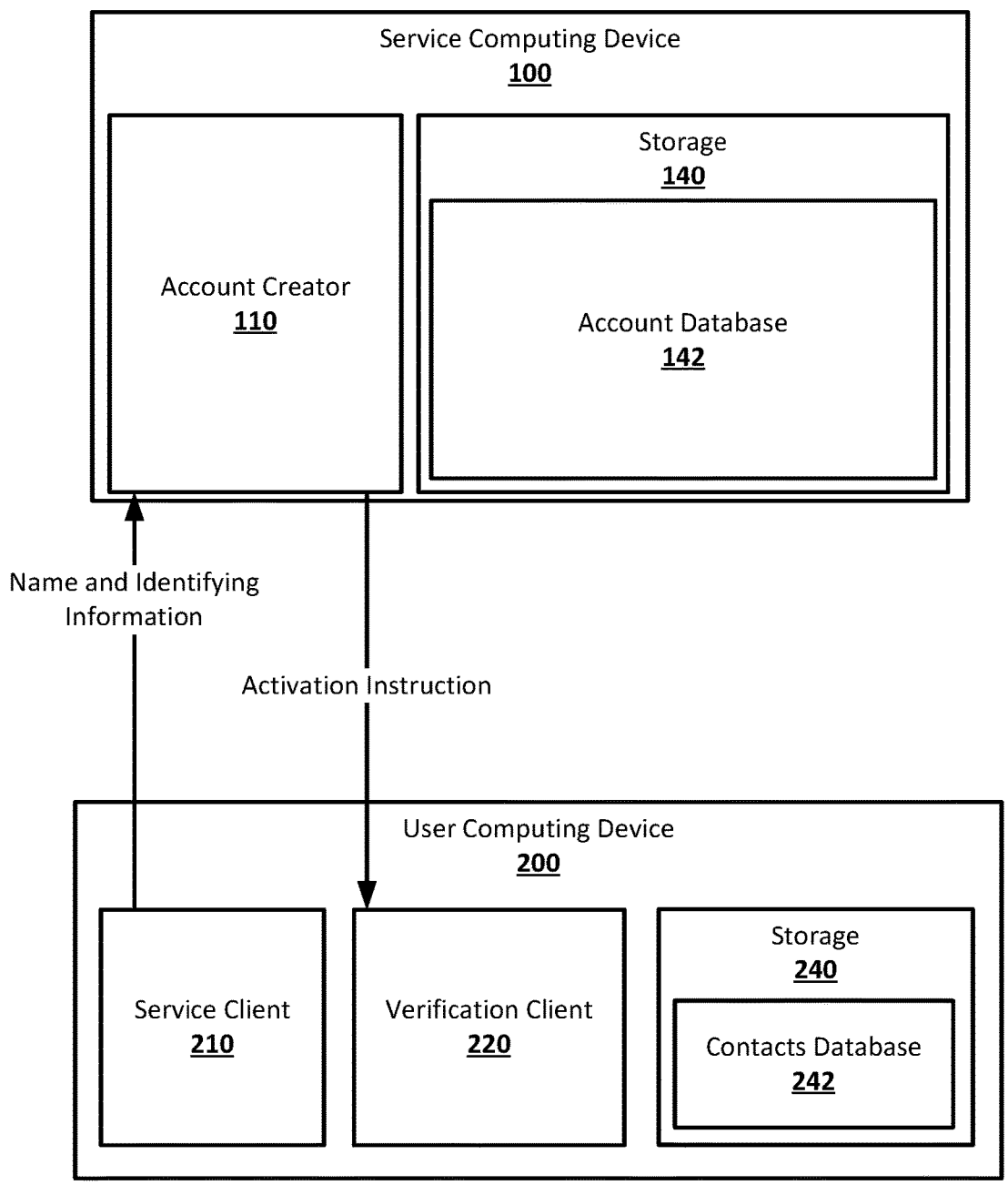
FIG. 3 shows an example arrangement suitable for decentralized name verification using recursive attestation according to an implementation of the disclosed subject matter.

FIG. 3 shows an example arrangement suitable for decentralized name verification using recursive attestation according to an implementation of the disclosed subject matter. A user, using the user computing device 200, may attempt to create an account for the account-based service provided by the service computing device 100. The user may use the service client 210, which may be, for example, a web browser or client application, to access the account creator 110 on the service computing device 100. As part of the process of creating an account, the user may enter a name, for example, a full name that the user represents to be their own name, and identifying information, such as a phone number, email address, or other communications address, to the service client 210. The name and identifying information may be transmitted to the account creator 110. The account creator 110 may then send an activation instruction to the verification client 220. In some implementations, the account creator 110 may send the activation instruction to the service client 210, which may then activate the verification client 220.

Figure 4:
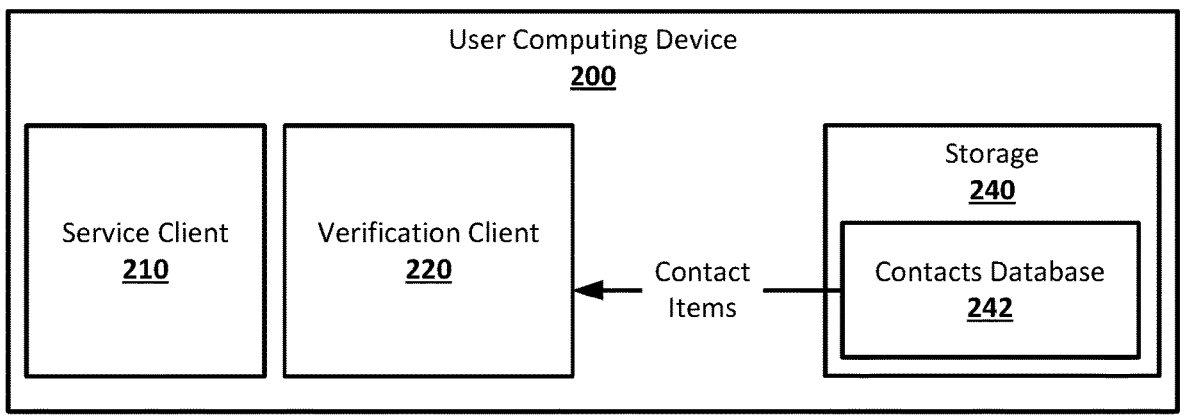
FIG. 4 shows an example arrangement suitable for decentralized name verification using recursive attestation according to an implementation of the disclosed subject matter.

FIG. 4 shows an example arrangement suitable for decentralized name verification using recursive attestation according to an implementation of the disclosed subject matter. The activation instruction may be an instruction that, when received by the verification client 220, causes the verification client 220 access the contacts database 242. The verification client 220 may cause the user of the user computing device 200 to presented with a user interface that allows the user to select contact items from the contacts database 242. The user interface may be presented by the verification client 220, or may be presented by the service client 210 which may receive access to the contacts database 242 through the verification client 220.

Figure 5:
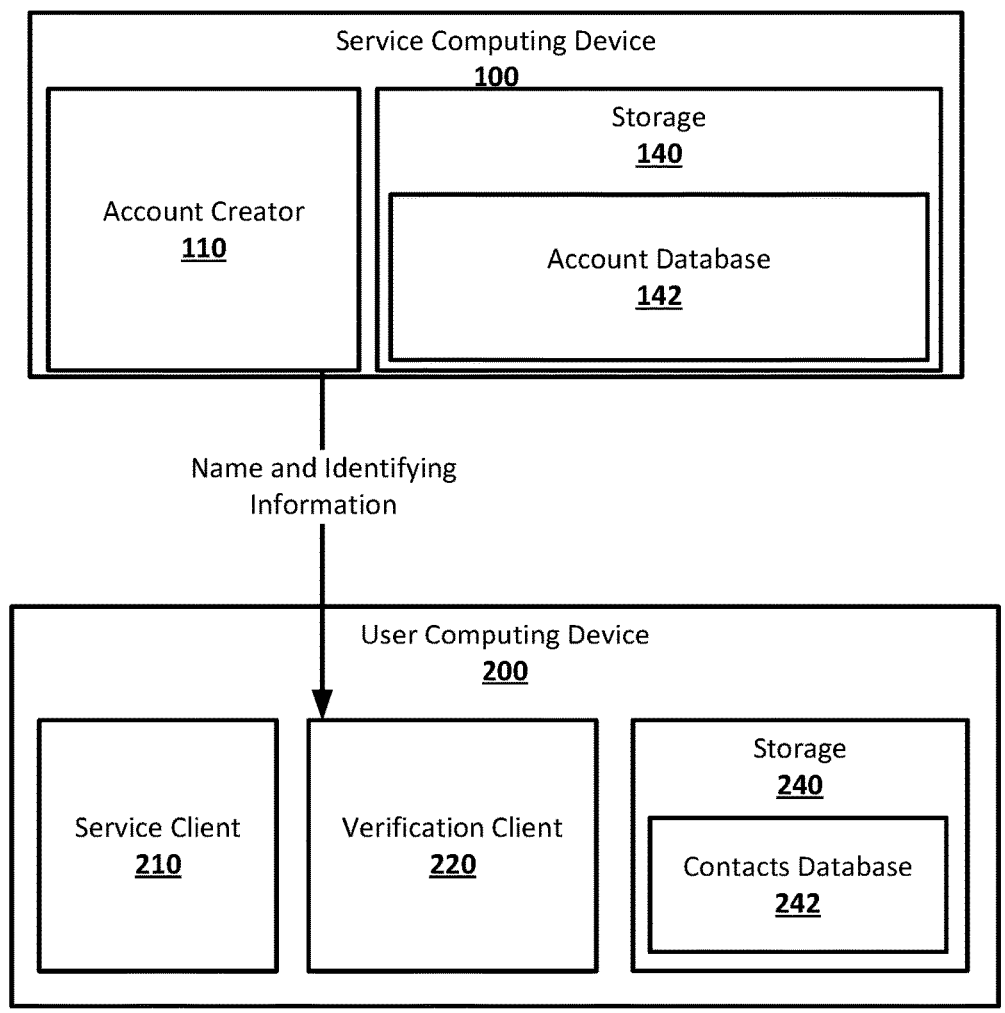
FIG. 5 shows an example arrangement suitable for decentralized name verification using recursive attestation according to an implementation of the disclosed subject matter.

FIG. 5 shows an example arrangement suitable for decentralized name verification using recursive attestation according to an implementation of the disclosed subject matter. The user of the user computing device 200 may select a specified number of contact items from the contact database 242. The selected contact items may identify entities, such as people, groups, or organizations, that the user wants to be used to determine an attestation score for the name and identifying information provided by the user using the service client 210 to the account creator 110. The account creator 110 may provide the verification client 220 with the name and identifying information that were provided by the service client 210. In some implementations, the service client 210 may provide the name and identifying information to the verification client 220. In some implementations, the verification client 220 may provide the selected contact items to the account creator 110.

Figure 6:
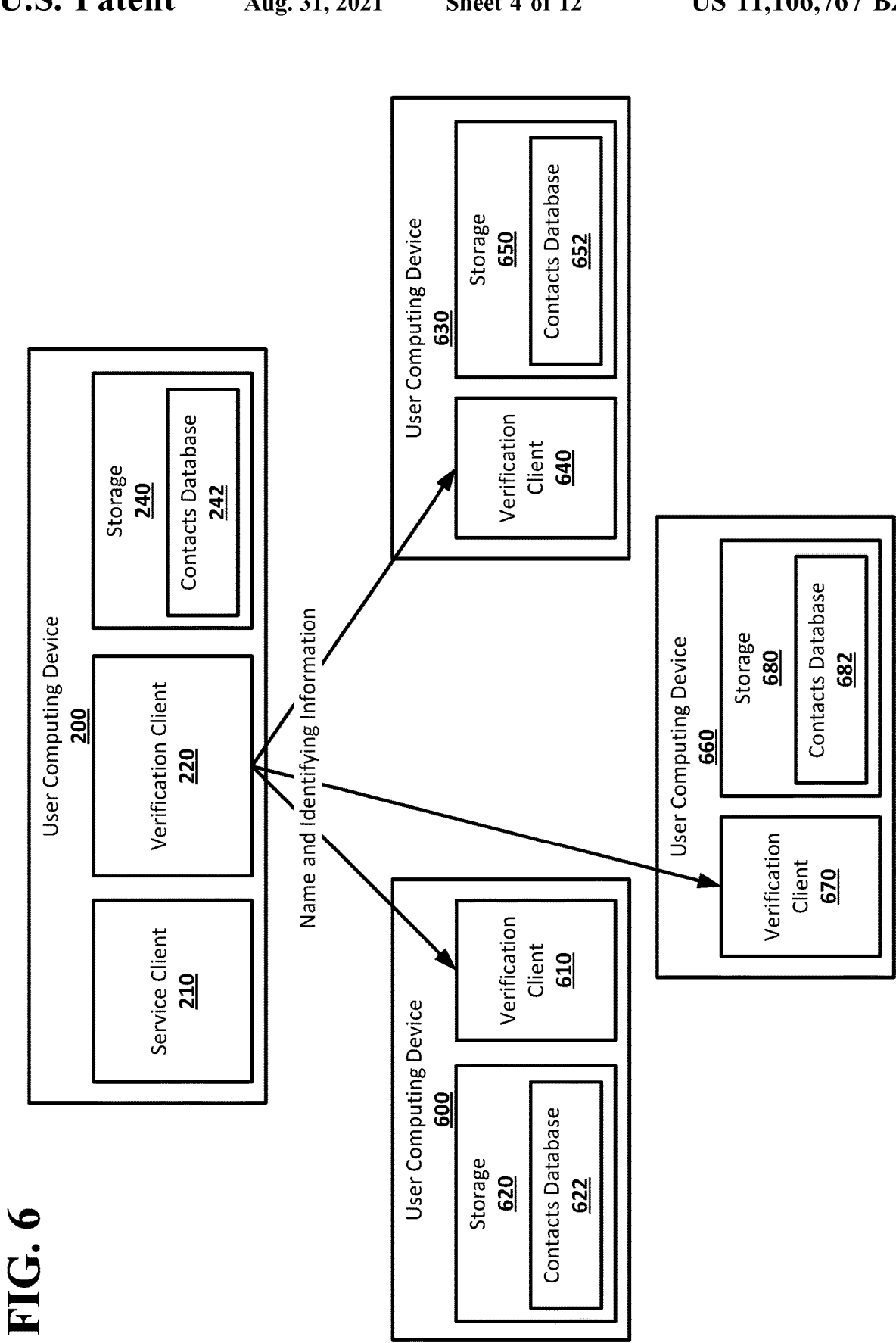
FIG. 6 shows an example arrangement suitable for decentralized name verification using recursive attestation according to an implementation of the disclosed subject matter.

FIG. 6 shows an example arrangement suitable for decentralized name verification using recursive attestation according to an implementation of the disclosed subject matter. The verification client 220 may transmit the name and identifying information to verifications clients, and instances of the decentralized verification application, on computing devices based on the contact items selected by the user from the contacts database 242. For example, the verification client 220 may transmit the name and identifying information to the user computing devices 600, 630, and 660, which may each be associated with a contact item that was selected by the user of the user computing device 200. The user computing devices 600, 630, and 660 may be computing devices similar to the user computing device 200, such as, for example, a computer 20 as described in FIG. 14. For example, the user computing device 600 may be a smartphone with a phone number that is included in one of the contact items selected from the contacts database 242 by the user of the user computing device 200. The user computing device 600 may include a verification client 610 and a storage 620 which may store a contacts database 622. The user computing device 630 may include a verification client 640 and a storage 650 which may store a contacts database 652. The user computing device 660 may include a verification client 670 and a storage 628 which may store a contacts database 682.

The verification client 220 may transmit the name and identifying information in any suitable manner. For example, the verification client 220 may transmit the name and identifying information to the user computing devices 600, 630, and 660 directly, or the name and identifying information may be broadcast to a peer-to-peer network of verification clients along with data associated with the selected contact items, such as, for example, a hash of a phone number. Each verification client may know the hash of the phone number of the computing device on which the verification client is running and may accept a name and identifying information with a matching hash of a phone number received from any other verification client.

FIG. 7 shows an example arrangement suitable for decentralized name verification using recursive attestation according to an implementation of the disclosed subject matter. Each of the user computing devices 600, 630, and 660 which may be associated with a contact item selected from the contacts database 242 may search its respective contacts database for a contact item that includes the received name and identifying information. For example, the verification client 610 may search the contacts database 622, the verification client 640 may search the contacts database 652, and the verification client 660 may search the contacts database 682.

The results of the search may indicate whether any contact item in a contacts database was found that included both the name and identifying information. For example, if the name is "Tom Smith" and the identifying information is a phone number of "555-555-1234", the search may indicate a contact item with the name and identifying information has been found when that contact item includes both the name "Tom Smith" and the phone number "555-555-1234." A contact item which includes the name "Tom Smith" but does not include the phone number "555-555-1234", either because the contact item includes no phone number of includes a different number, may not be responsive to the search. Similarly, a contact item that includes the phone number "555-555-1234" but does not include in the name "Tom Smith" may not be responsive to the search.

Figure 8:
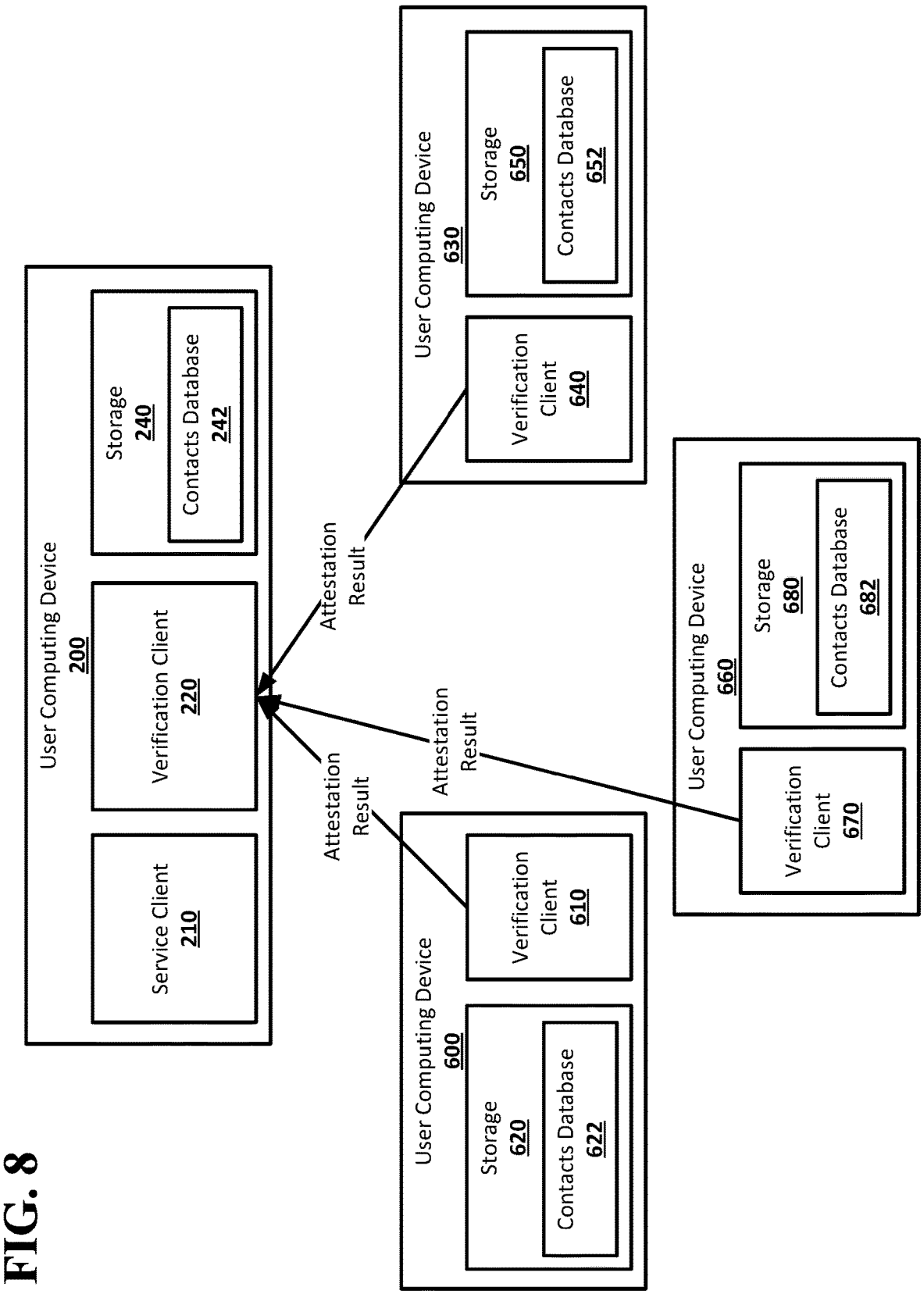
FIG. 8 shows an example arrangement suitable for decentralized name verification using recursive attestation according to an implementation of the disclosed subject matter.

FIG. 8 shows an example arrangement suitable for decentralized name verification using recursive attestation according to an implementation of the disclosed subject matter. Each of the user computing devices 600, 630, and 660 may return attestation results to the verification client 220. The attestation result from a computing device may be based on whether a contact item including the name and identifying information was found in the contacts database on that computing device. For example, if the user computing device 600 found a contact item in the contacts database 622 that included both the name and identifying information, the verification client 610 may return a positive attestation to the verification client 220. If the user computing device 630 did not find a contact item in the contacts database 652 that included both the name and identifying information, the verification client 640 may return a null attestation result to the verification client 220, or may return a negative attestation if negative attestations are being used.

In some implementations, the attestation results may be returned to a verification client other than the verification client 220. For example, the attestation results may be returned to a verification client on one of the computing devices that has generated an attestation result, such as the verification client 610, or may be returned to any other verification client that may be part of the peer-to-peer network with the verification clients that generated the attestation results.

Figure 9:
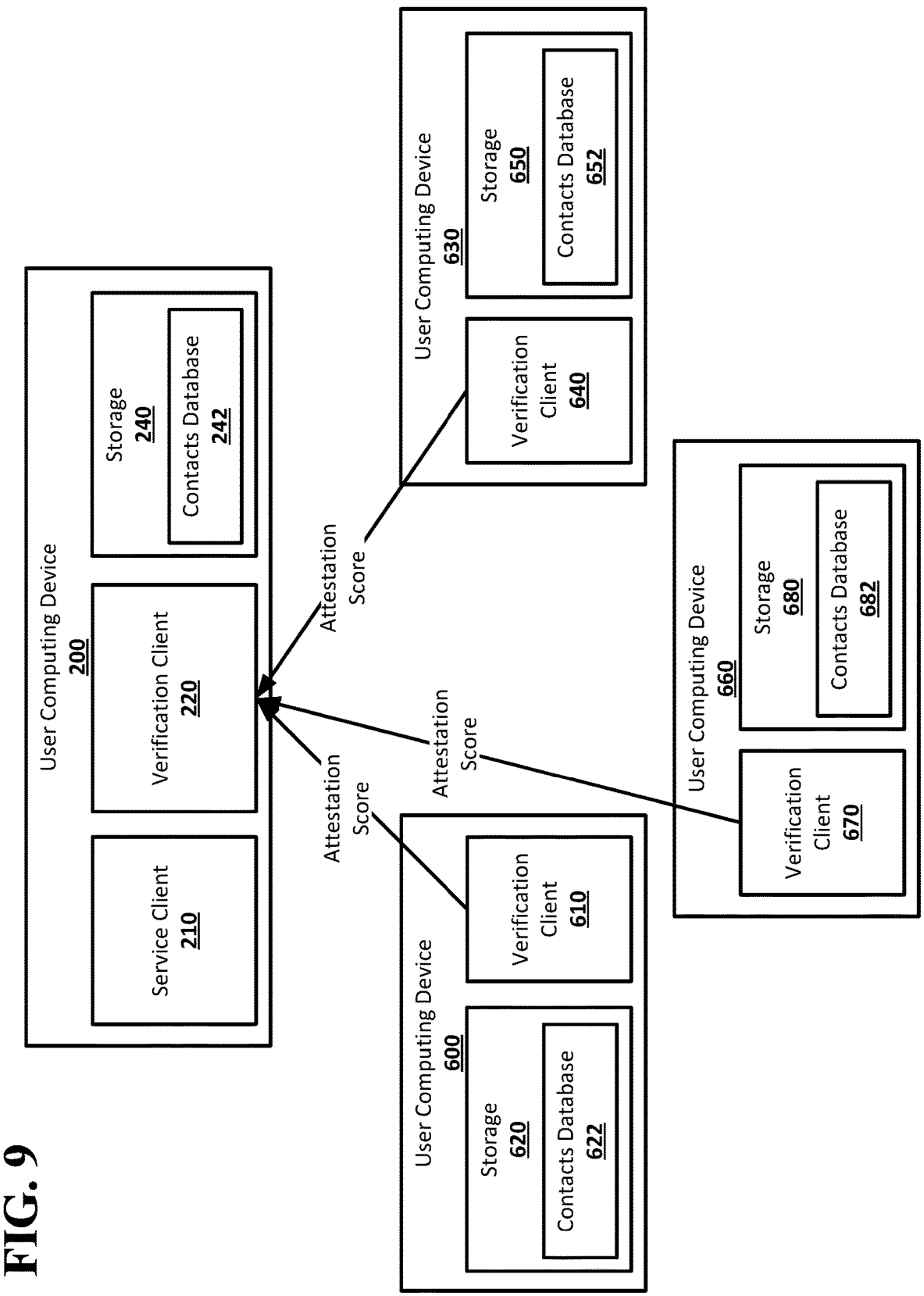
FIG. 9 shows an example arrangement suitable for decentralized name verification using recursive attestation according to an implementation of the disclosed subject matter.

FIG. 9 shows an example arrangement suitable for decentralized name verification using recursive attestation according to an implementation of the disclosed subject matter. Each of the user computing devices 600, 630, and 660 may send an attestation score to the verification client 220. The attestation score sent by the user computing device 600 may be for the entity identified by the contact item that was selected by the user from the contacts database 242 with which the user computing device 600 was associated. For example, the contact item associated with the user computing device 600 may have included a name and phone number which may identify a user of the user computing device 600 who owns the contacts database 622. The attestation score for the user of the user computing device 600 may be determined based on attestations from other user computing devices running instances of the verification client. The verification clients may search the contact databases on their computing devices for the name and phone number of the user of the user computing device 600, as provided by the contact item in the contacts database 242. Attestations from these computing devices may be weighted by attestation score of the computing device which generated them, and these attestation scores may be determined similarly to determining the attestation score for the user of the user computing device 600. In this way, attestation scores may be determined recursively, for example, defined by the principle eigenvector of an attestation matrix. The attestation matrix may be, for example, a matrix of normalized local trust values as used in implementations of the EigenTrust algorithm.

The user computing device 600 may have the attestation score stored in the storage 620, where it may be accessed by the verification client 610 and sent to the verification client

220. The attestation score may also be determined anew before being sent to the verification client 220. Determination of an attestation score may be performed by the verification client on the computing device associated with the entity for whom the attestation score is being determined, or may be determined on any other verification client.

In some implementations, the attestations scores for the user computing devices 600, 630, and 660 may be stored on, or determined by, other user computing devices and their respective verification clients. For example, the attestations scores for the user computing devices 600, 630, and 660 may be stored on another computing device with a verification client in the peer-to-peer network of verification clients, and that verification client may send the attestation scores to the verification client 220 based on a received request for those attestation scores that may have been broadcast by the verification client 220.

In some implementations, the attestation scores may be sent to the same verification client to which the attestation results were sent, which may be different from the verification client 220. For example, if the attestation results were returned to the verification client 610, all attestation scores may be sent to the verification client 610. If the attestation results were returned to some other verification client, the attestation scores may also be sent to that verification client.

Figure 10:
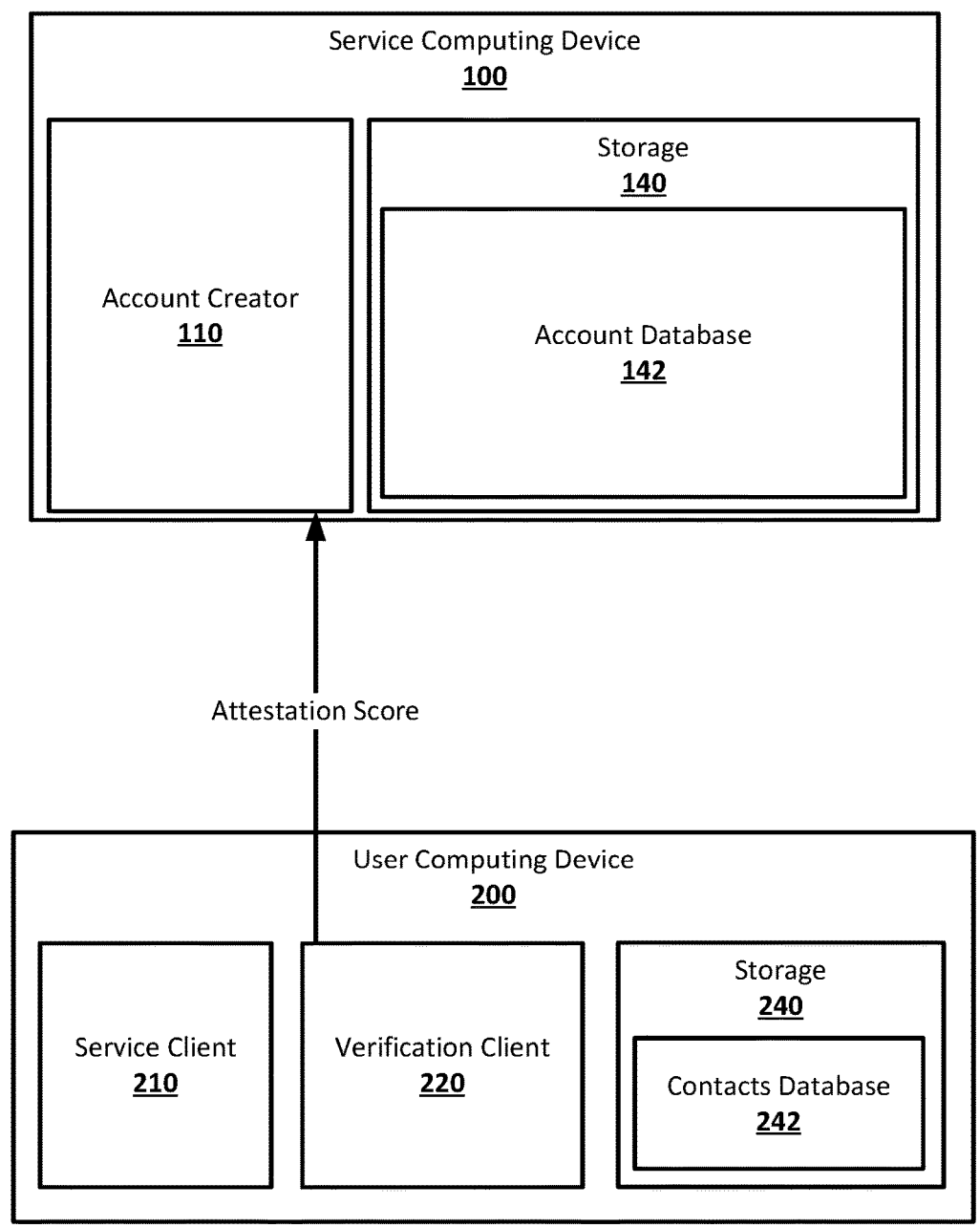
FIG. 10 shows an example arrangement suitable for decentralized name verification using recursive attestation according to an implementation of the disclosed subject matter.

FIG. 10 shows an example arrangement suitable for decentralized name verification using recursive attestation according to an implementation of the disclosed subject matter. The verification client 220 may use the attestation results received from the verification clients 610, 640, and 670 of the user computing devices 600, 630, and 660 to determine an attestation score for the name and identifying information that the user of the user computing device 200 provided to the account creator 110 using the service client 210. For example, the verification client 220 may weight each received positive attestation result by the attestation score of the entity associated with the computing device which generated the attestation. A positive attestation received from the verification client 610 may be weighted by the attestation score for the entity identified by the contact item associated with the user computing device 600 that was selected from the contacts database 242. A positive attestation may, for example, have a value of 1, and an attestation score may be a normalized local trust value between 0 and 1, as used in the EigenTrust algorithm.

In some implementations, the attestation score for the name and identifying information provided by the service client 210 may be determined on a verification client different than the verification client 220. For example, the attestation score may be determined on any of the verification clients 610, 640, and 670, or on any other verification client that may be part of the peer-to-peer network of verification clients. Determining the attestation score for a name and identifying information on a different computing device from the computing device used to provide the name and identifying information for which the attestation score is being determined may prevent the entity that provided the name and identifying information from tampering with the determination of the attestation score for that name and identifying information.

The attestation score for the name and identifying information may be sent to the account creator 110. The account creator 110 may use the attestation score to determine whether to create the account for the account-based service provided by the service computing device 100 using the name and identifying information for which the attestation score was generated. For example, the account creator 110 may have a threshold value that an attestation score for a name and identifying information must meet or exceed to allow for account creation with that name and identifying information. If the threshold is met or exceeded, the account creator 110 may create the account using the name and identifying information entered by the user and provided by the service client 210 and store the account in the accounts database 142. Otherwise, the account may not be created.

Figure 11:
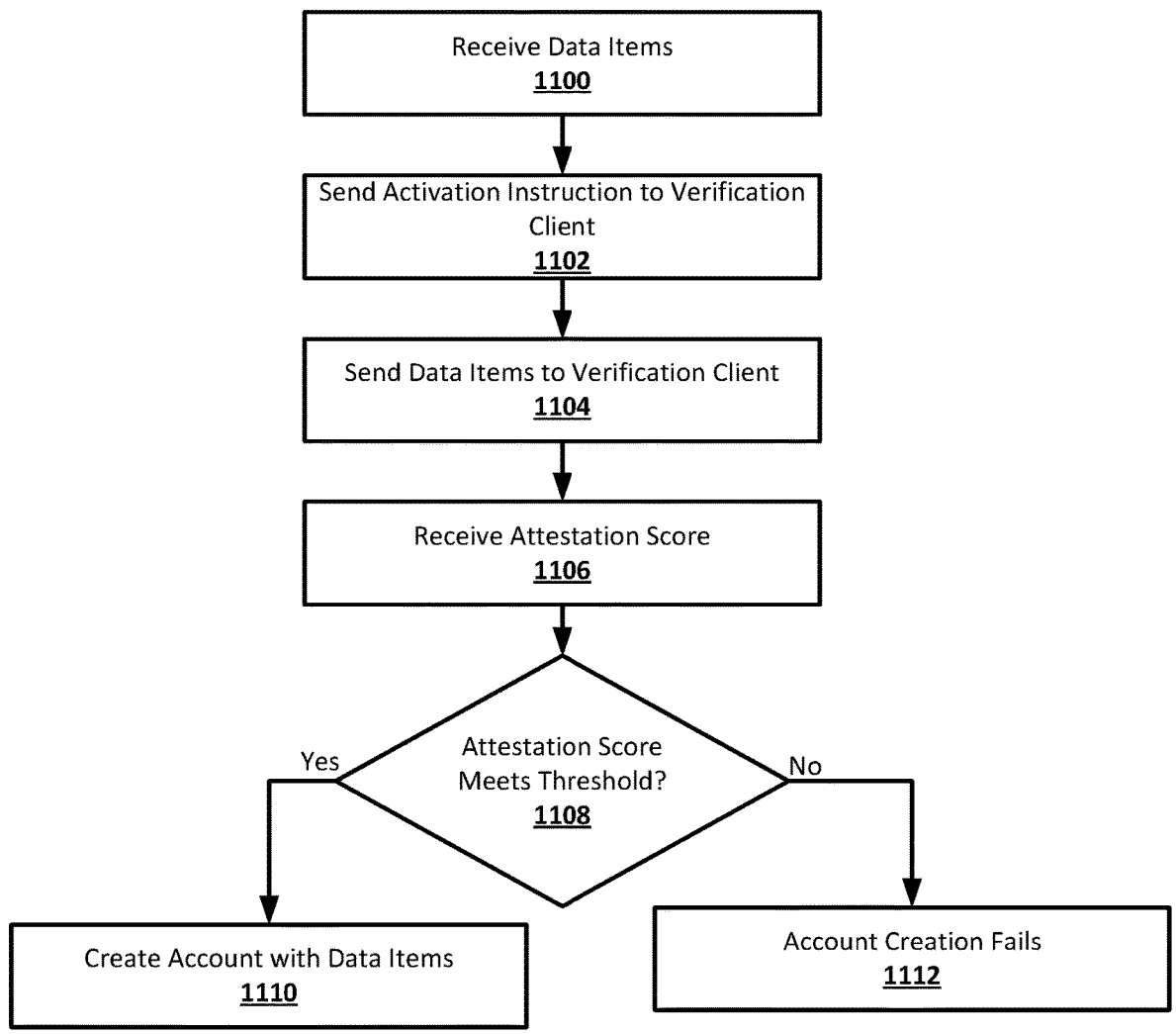
FIG. 11 shows an example procedure suitable for decentralized name verification using recursive attestation according to an implementation of the disclosed subject matter.

FIG. 11 shows an example procedure suitable for decentralized name verification using recursive attestation according to an implementation of the disclosed subject matter. At 1100, two data items may be received. The two data items may be any data items that may be found in a contact item, such as a full name, communications address such as an email address, phone number, social media service username, or messaging service username, physical address, or any other data that may describe or identify an entity that may be a person, group, or organization. The two data items may be, for example a full name and identifying information such as a phone number or email address. For example, a user of the user computing device 200 may use the service client 210 to create an account for an account-based service provided by the service computing device 100. The service client 210 may send a name and phone number to the account creator 110 during the creation of the account.

At 1102, an instruction to activate a verification client may be sent. For example, the account creator 110 may send an activation instruction to the verification client 220 after receiving a name and identifying information from the service client 210. The verification client 220 may access the contacts database 242 to present a user interface to the user of the user computing device 200 that can be used to select contact items.

At 1104, the two data items may be sent. For example, the account creator 110 may send the name and identifying information received from the service client 210 to the verification client 220. The verification client 220 may use the contact items selected from the contacts database 242 by the user to start recursive attestation for the name and identifying information. The name and identifying information may be provided to instances of the verification client on computing devices associated with the contact items selected by the user from the contacts database 242. Each instance of the verification client associated with a contact item selected by the user may determine if the name and identifying information are included in a contact item in a contacts database on its computing device. For example, the verification client 610 may search the contacts database 622 to determine if it includes a contact item that includes both the name and identifying information that were provided to the account creator 110 by the service client 210. Each instance of the verification client may provide an attestation result to the verification client 220. The attestations result provided by a verification client may be a positive attestation when the verification client found a contact item that included both the name and identifying information in the contacts database on its computing device. The verification client 220 may weight each positive attestation by the attestation score of the entity associated with the computing device from which the positive attestation was received. The attestation score of such an entity may have been determined in a similar manner, for example, based on weighting attestations for that entity received from other computing devices with other instances of the verification client.

At 1106, an attestation score may be received. For example, the attestation score determined by the verification client 220 for the name and identifying information provided to the account creator 110 by the service client 210 may be received at the account creator 110.

At 1108, if the attestation score meets a threshold, flow may proceed to 1110. Otherwise, flow may proceed to 1112.

At 1110, an account may be created. For example, the attestation score received by the account creator 110 for the name and identifying information may meet or exceed a threshold. The account creator 110 may create an account for the account-based service provided by the service computing device 100 with the name and identifying information. The account may be stored in the accounts database 142.

At 1112, account creation may fail. For example, the attestation score received by the account creator 110 for the name and identifying information may not meet or exceed the threshold.

Figure 12:
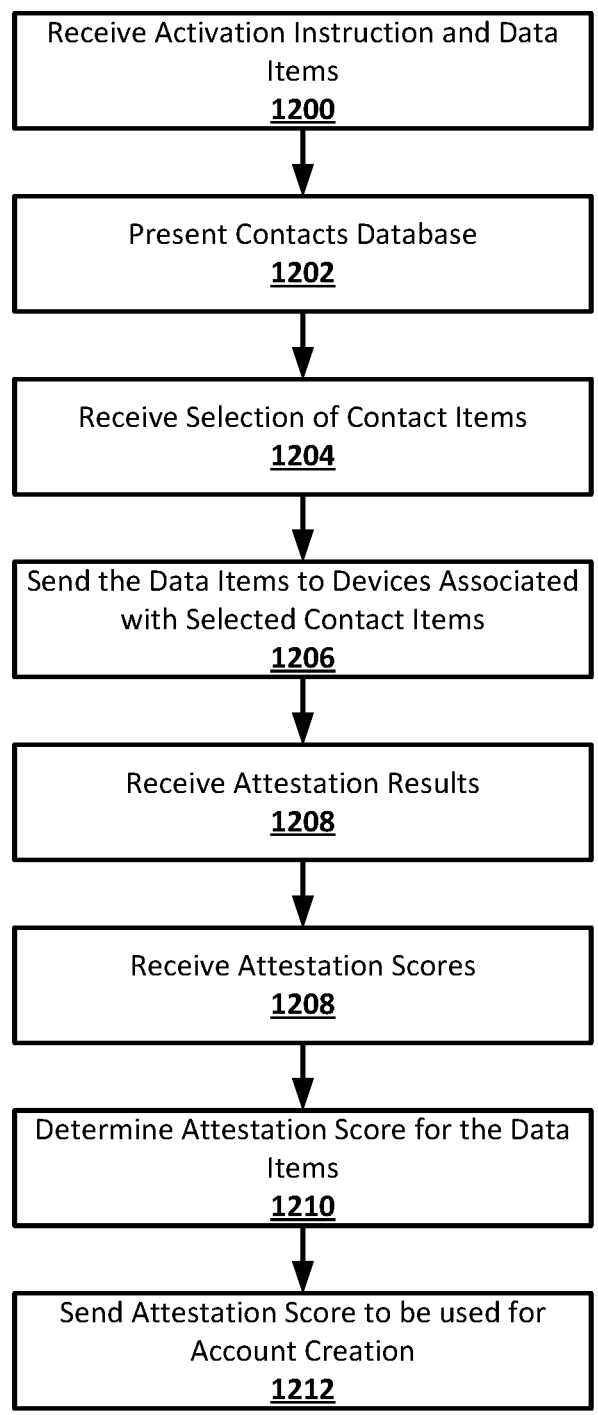
FIG. 12 shows an example procedure suitable for decentralized name verification using recursive attestation according to an implementation of the disclosed subject matter.

FIG. 12 shows an example procedure suitable for decentralized name verification using recursive attestation according to an implementation of the disclosed subject matter. At 1200, an activation instruction and two data items may be received. For example, the verification client 220 of the user computing device 200 may receive an activation instruction from the account creator 110. The account creator 110 may have been provided with two data items, such as a name and identifying information, by the service client 210 during account creation. The two data items may also be provided to the verification client 220 by the account creator 110.

At 1202, a contacts database may be presented on a user interface. For example, the verification client 220 may access the contacts database 242 to present contact items from the contacts database 242 on a user interface on the user computing device 200. The user interface may allow a user of the user computing device 200 to select a number of contact items to be used in determining an attestation score for the name and identifying information provided to the account creator 110 by the service client 210.

At 1204, a selection of contact items may be received. For example, the verification client 220 may receive the selection of contact items from the contacts database 242 made by the user of the user computing device 200.

At 1206, the two data items may be sent. For example, the verification client 220 may send the name and identifying information to computing devices, each with their own instance of the verification client, that are associated with the contact items selected by the user from the contacts database 242. The verification client 220 may send out the name and identifying information in any suitable manner. For example, the verification client 220 may broadcast the name and identifying information to a peer-to-peer network formed by instances of the verification client on various computing devices. The broadcast may include data that may be used by an instance of the verification client to determine whether it is running on a computing device that is associated with any of the contact items selected by the user from the contacts database 242. This data may be, for example, based on data from the contact item, such as phone number.

At 1208, attestation results may be received. For example, the verification client 220 may receive attestation results from the verification clients on computing devices associated with the contact items selected by the user from the contacts database 242, such as the verification clients 610, 640, and 670 on the user computing devices 600, 630, and 660. An attestation result may be a positive attestation, for example, when a verification client found the name and identifying information in a contact item in the contact database on its computing device, or a null attestation, for example, when a verification client did not find the name and identifying information in a contact item in the contact database on its computing device.

At 1210, attestation scores may be received. For example, the verification client 220 may receive an attestation score from each verification client that returned a positive attestation to the verification client 220 as an attestation result. The attestation score may be for the entity that is associated with the computing device on which the verification client that returned the attestation result is running. For example, the verification client 610 of the user computing device 600 may return a positive attestation to the verification client 220. The verification client 610 may also send an attestation score for an entity that is associated with the user computing device 600, for example, an entity to whom the contacts database 622 belongs, to the verification client 220. The attestation score for the entity may be determined based on attestation results from other instances of the verification client, on other computing devices, in the peer-to-peer network, weighted by the attestation score for the entities associated with those other computing devices that return positive attestations.

At 1212, an attestation score may be determined. For example, the verification client 220 may determine an attestation score for the name and identifying information provided to the account creator 110 by the service client 210. The attestation score may be determined using the attestation results and attestations scores received from the verification clients, for example, the verification clients 610, 640, and 670. Any positive attestation received from a verification client may be weighted by the attestation score received from that verification client.

At 1214, the attestation score may be sent. For example, the verification client 220 may send the attestation score for the name and identifying information to the account creator 110. The account creator 110 may use the attestation score to determine whether to allow the name and identifying information to be used in the creation of an account for the account-based service provided by the service computing device 100.

Figure 13:
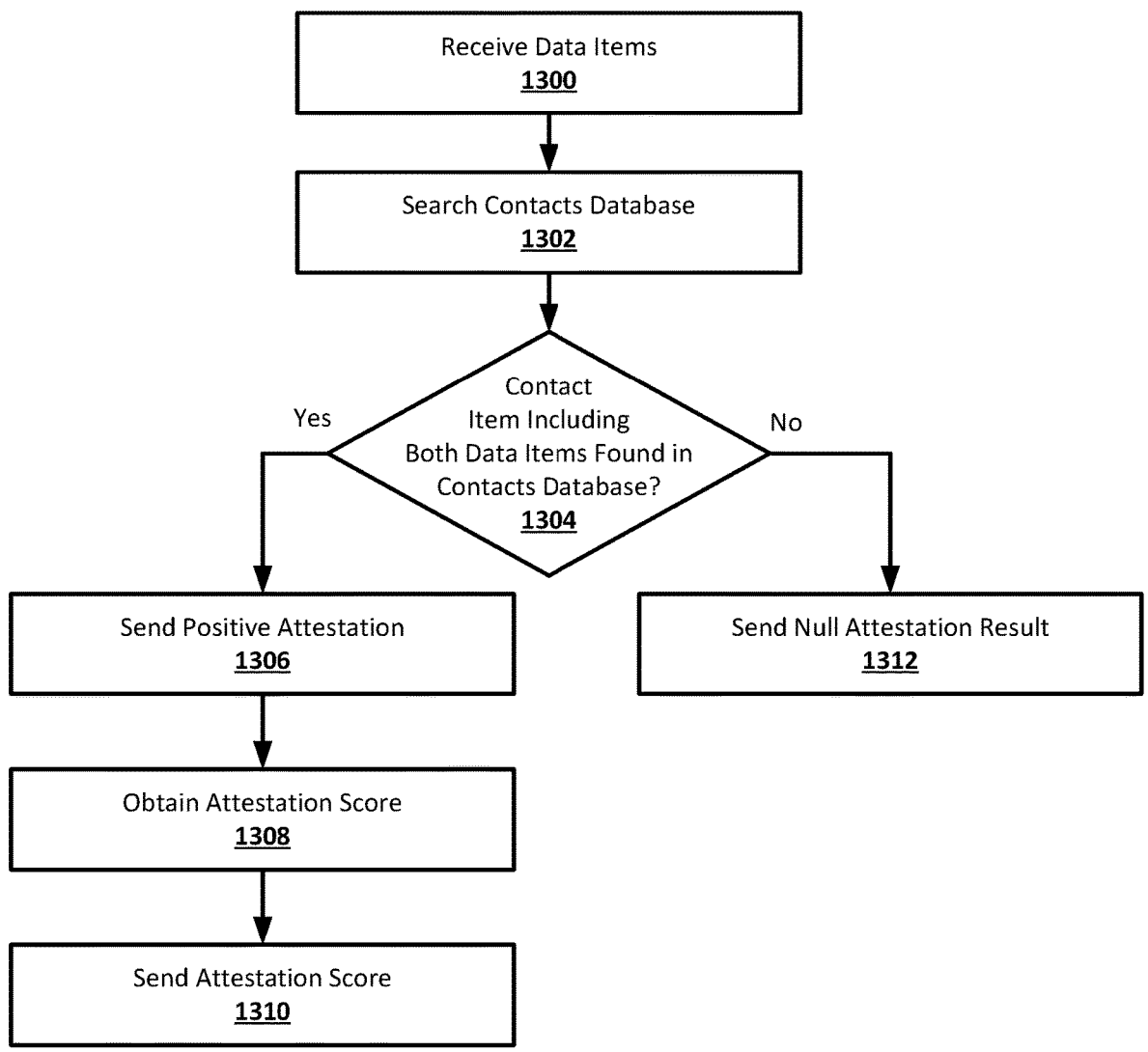
FIG. 13 shows an example procedure suitable for decentralized name verification using recursive attestation according to an implementation of the disclosed subject matter.

FIG. 13 shows an example procedure suitable for decentralized name verification using recursive attestation according to an implementation of the disclosed subject matter. At 1300, two data items may be received. For example, the verification client 610 of the user computing device 600 may receive the name and identifying information broadcast by the verification client 220. The user computing device 600 may be associated with a contact item that was selected by the user of the user computing device 200 from the contacts database 242.

At 1302, a contacts database may be searched. For example, the verification client 610 may search the contacts database 622 for a contact item that includes both of the two data items, for example, the name and identifying information, received from the verification client 220. A contact item that is responsive to the search may include both of the data items, for example, both the name and identifying information. A contact item that only includes one of the data items but not the other may not be responsive to the search.

At 1304, if a contact item is found with both data items, flow may proceed to 1306. Otherwise, flow may proceed to 1312.

At 1306, an attestation result that is a positive attestation may be sent. For example, the verification client 610, having found a contact item that included both data items, for example, the name and identifying information, in the contacts database 622, may return a positive attestation as an attestation result to the verification client 220.

At 1308, an attestation score may be obtained. For example, the verification client 610 may obtain an attestation score for the entity associated with the user computing device 600, which may be the entity to whom the contacts database 622 belongs. The attestation score may already be stored on the user computing device 600 or may be determined anew. To determine the verification score, the verification client 610 may obtain attestation results for the entity, for example, based on a name and identifying information for the entity, from other instances of verification clients in the peer-to-peer network. The other instances of verification clients that return positive attestations to the verification client 610 may also provide attestation scores for their associated entities. These attestation scores may have been determined in the same manner as the attestation score for the entity associated with the user computing device 600, resulting in the determination of attestation scores being recursive.

At 1310, the attestation score may be sent. For example, the attestation score for the entity associated with the user computing device 600 may be sent to the verification client 220. The verification client 220 may weight the positive attestation returned by the verification client 610 using the attestation score for the entity associated with the user computing device 600 when determining the attestation score for the two data items, for example, the name and identifying information, that were sent from the verification client 210 to the verification client 610.

At 1312, an attestation result that is a null may be sent. For example, the verification client 630 may not have found a contact item that included both data items, for example, the name and identifying information, in the contacts database 652. The verification client 630 may return an attestation result that is null to the verification client 220. In some implementations, negative attestations may be sent instead of an attestation result that is null.

Figure 14:
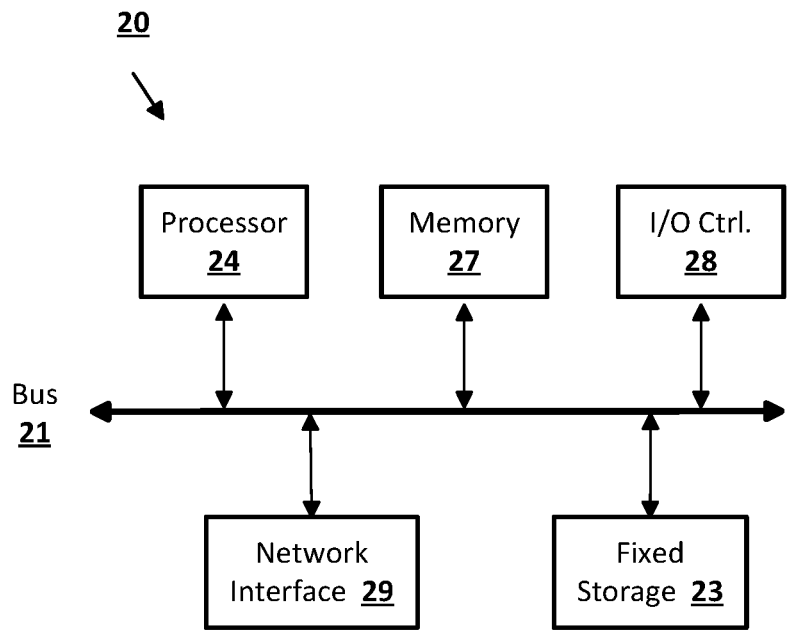
FIG. 14 shows a computer according to an embodiment of the disclosed subject matter.

Embodiments of the presently disclosed subject matter may be implemented in and used with a variety of component and network architectures. FIG. 14 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 15.

Many other devices or components (not shown) may be connected in a similar manner, such as document scanners, digital cameras, auxiliary, supplemental, or backup systems, or the like. Conversely, all of the components shown in FIG. 14 need not be present to practice the present disclosure. The components can be interconnected in different ways from that shown. The operation of a computer such as that shown in FIG. 14 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 15:
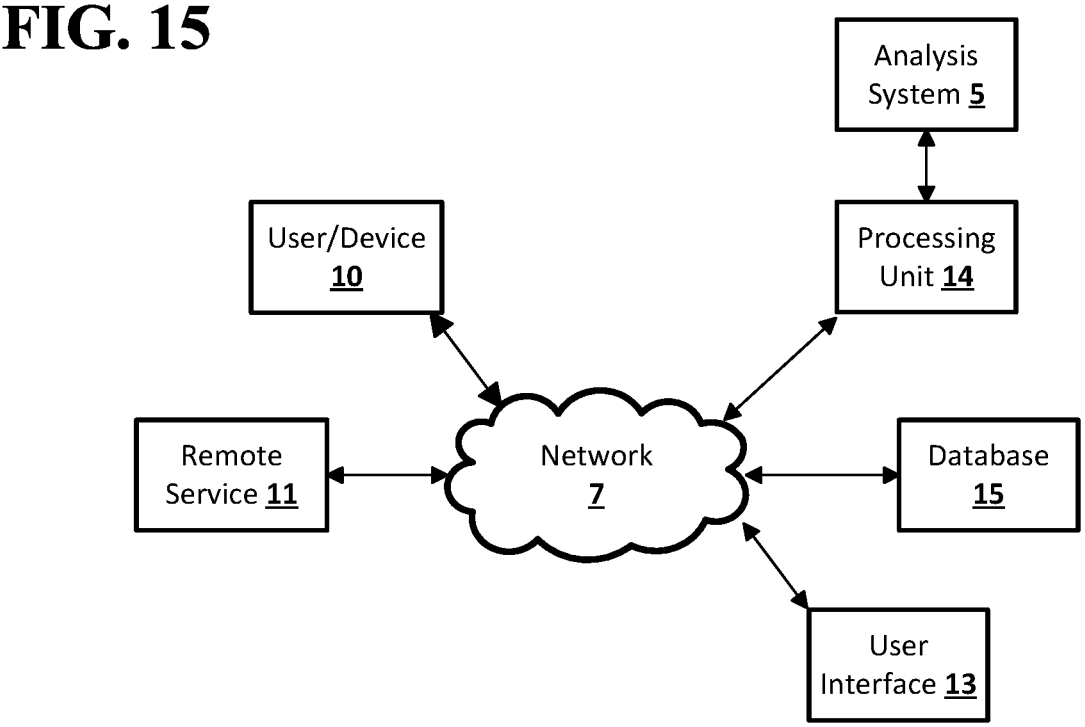
FIG. 15 shows a network configuration according to an embodiment of the disclosed subject matter.

FIG. 15 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed on a data processing apparatus comprising:
   receiving, at a computing device, a name and identifying information;
   determining, by the computing device, that there is a contact item comprising both the name and the identifying information in a contacts database stored on the computing device or accessible to the computing device;
   sending a positive attestation and an attestation score for an entity associated with the computing device to be used to generate an attestation score for the name and identifying information, wherein the attestation score for the name and identifying information is used to determine whether to allow the creation of an account with the name; wherein the attestation score for the entity associated with the computing device is generated based on at least one positive attestation from at least one other computing device, and wherein the at least one other computing device generated the positive attestation upon finding a name and identifying information for the entity in a contact item in a contacts database stored on or accessible to that at least one other computing device.

2. The method of claim 1, wherein the identifying information comprises a communications address.

3. The method of claim 2, wherein the communications address comprises at least one of a phone number, an email address, a social media service username, and a messaging service username.

4. The method of claim 1, wherein the attestation score for the name and identifying information is based at least on a weighting of the positive attestation by the attestation score of the entity, and wherein the positive attestation is assigned a numerical value.

5. The method of claim 1, wherein the name and identifying information are received from a service computing device that provides an account-based service.

6. The method of claim 1, wherein the computing device is associated with a contact item from a contacts database that is associated with the name and identifying information.

7. A computer-implemented method performed on a data processing apparatus comprising:
   receiving one or more positive attestations for a name and identifying information, wherein each positive attestation is received from one of one or more computing devices;
   receiving one or more attestation scores, wherein each attestation score is associated with one of the one or more positive attestations and is an attestation score for an entity associated with the computing device from which the attestation score's associated positive attestation was received; and
   generating an attestation score for the name and identifying information using the one or more received positive attestations and the one or more received attestation scores.

8. The method of claim 7, a positive attestation of the one or more positive attestations is received from one of the one or more computing device when the one of the one or more computing devices finds a contact item that comprises the name and identifying information in a contacts database.

9. The method of claim 7, wherein an attestation score of the one or more attestation scores that is an attestation score for an entity associated with the computing device from which the attestation score's associated positive attestation was received is based on one or more positive attestations for the entity and one or more attestation scores associated with the one or more positive attestations for the entity.

10. The method of claim 7, further comprising generating an account for an account-based service using the name when the attestation score for the name and identifying information exceeds a threshold.

11. The method of claim 7, wherein each of the one or more computing devices are associated with a separate contact item in a contacts database stored on or accessible to a user computing device from which the name and identifying information were sent to service computing device that provides an account-based service.

12. The method of claim 7, wherein the identifying information comprises a phone number, email address, social media service username, or messaging service username.

13. A computer-implemented system comprising:
   a storage comprising a contacts database; and
   a processor of a computing device, the processor configured to receive a name and identifying information, determine that there is a contact item comprising both the name and the identifying information in the contacts database in the storage, and send a positive attestation and an attestation score for an entity associated with the computing device to be used to generate an attestation score for the name and identifying information, wherein the attestation score for the name and identifying information is used to determine whether to allow the creation of an account with the name, wherein the attestation score for the entity associated with the computing device is generated based on at least one positive attestation from at least one other computing device, and wherein the at least one other computing device generated the positive attestation upon finding a name and identifying information for the entity in a contact item in a contacts database stored on or accessible to that at least one other computing device.

14. The system of claim 13, wherein the identifying information comprises a communications address.

15. The system of claim 14, wherein the communications address comprises at least one of a phone number, an email address, a social media service username, and a messaging service username.

16. The system of claim 13, wherein the attestation score for the name and identifying information is based at least on a weighting of the positive attestation by the attestation score of the entity, and wherein the positive attestation is assigned a numerical value.

17. The system of claim 13, wherein the name and identifying information are received from a service computing device that provides an account-based service.

18. The system of claim 13, wherein the computing device is associated with a contact item from a contacts database that is associated with the name and identifying information.

* * * * *